No. 652,837. Patented July 3, 1900.
M. J. DONOVAN.
WHEEL FOR VEHICLES.
(Application filed Nov. 17, 1899.)
(No Model.)
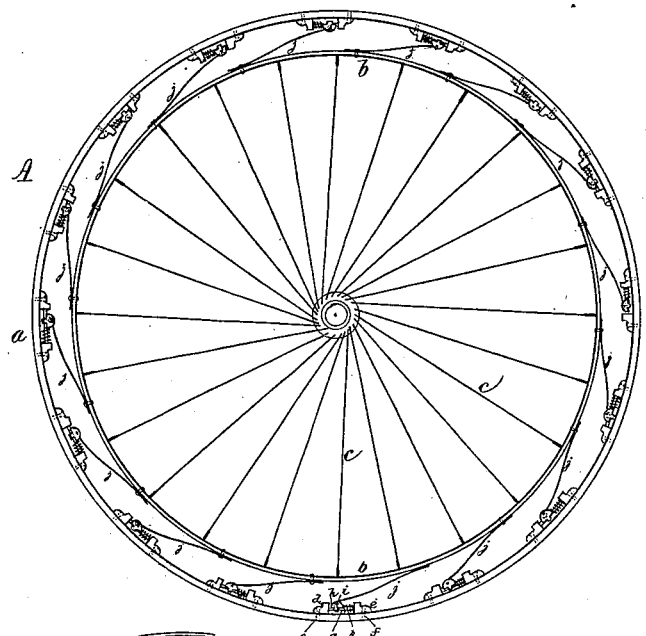
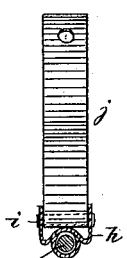
Fig. 4.
Fig. 1.
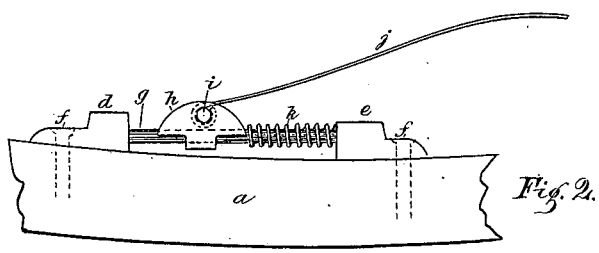
Fig. 2.
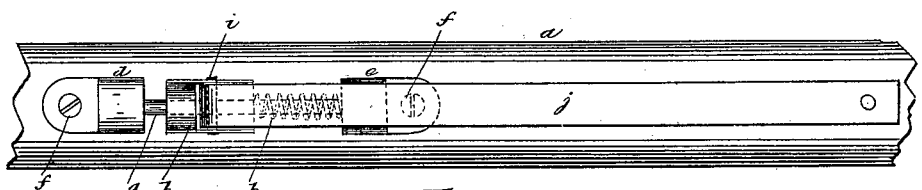
Fig. 3.
Witnesses
E. Baylis
Jas Gadsby
Inventor
Michael J. Donovan,
By W. Bruce
Atty
THE NORRIS PETERS CO., PHOTO-LITHO., WASHINGTON, D. C.

UNITED STATES PATENT OFFICE.

MICHAEL J. DONOVAN, OF WATERDOWN, CANADA, ASSIGNOR OF ONE-HALF TO DANIEL McNAMARA, OF BURLINGTON, CANADA.

WHEEL FOR VEHICLES.

SPECIFICATION forming part of Letters Patent No. 652,837, dated July 3, 1900.

Application filed November 17, 1899. Serial No. 737,273. (No model.)

*To all whom it may concern:*

Be it known that I, MICHAEL JAMES DONOVAN, a citizen of the Dominion of Canada, residing at Waterdown, in the county of Wentworth, in the Province of Ontario, Canada, have invented certain new and useful Improvements in Wheels; and I do hereby declare that the following is a full, clear, and exact description of the construction and operation of the same.

My invention relates to such improved construction of the wheels of bicycles and like wheel-vehicles as will do away with the necessity of the use of the present rubber pneumatic tires, the spring action of my improved wheel being such as will obviate the excessive vibration of the frame of the bicycle on ordinary roads and overcome the jolting of the rider's saddle when riding over rough ground and is calculated to possess all the advantages of the pneumatic tires without their disadvantages.

My invention consists in constructing an outer wooden rim or tire and an inner metallic rim to which the outer ends of the spokes are attached, the inner rim and the outer tire being connected together with a series of flat springs, one end of each of which is riveted to the inner rim and the outer end pivoted to a plate made to slide on a wire secured at each end to a block fastened to the inner surface of the outer tire, a spiral spring surrounding the wire at the back of the slide to cushion it, while a rubber cushion may be added to the front part of it to assist in reducing concussion when the wheel strikes an obstruction. I attain these objects by the mechanism illustrated in the accompanying drawings.

Figure 1 represents a side view of a bicycle-wheel embodying my invention. Fig. 2 is a side view of a spring and slide-plate enlarged. Fig. 3 is a top view of the same. Fig. 4 is an end view of slide-plate and wire upon which it slides.

In the accompanying drawings, A represents a wheel of a bicycle, in which $a$ is the outer rim, of wood or its equivalent, which may be of any desired thickness commensurate with strength—say from five-eighths of an inch to seven-eighths of an inch.

$b$ is the inner rim, of metal, about half oval, to which the spokes $c$ are attached in the usual manner and upon which I claim nothing. A space of about one and a half inches is left between the outer and the inner rims.

A series of projections or blocks $d\ e$ are secured at intervals around the inner side of the outer tire, each by a screw $f$, the said blocks being about one inch and a half apart and connected together by a wire $g$ of sufficient strength to carry thereon a plate $h$, which is made to slide on the wire, a hole being made through the block, if solid, to receive it, or when sheet metal is bent to form an opening in the bottom of it for the wire to pass through, as shown at Fig. 4.

A pin $i$ is made to pass through the upper portion of the slide block or plate $h$, and one end of a flat spring $j$ is pivotally connected to the said pin $i$ and the other end firmly secured by rivet or otherwise to the outer edge of the inner rim $b$, as shown at Fig. 1, to give the same elasticity as the pneumatic tires. The drawings show sixteen of the said flat springs at certain intervals apart, and there is a spiral spring $k$ around each of the wires $f$, behind each slide-plate $h$, for assisting to keep the said slide-plates in their normal position. It may further be said that the movement of the springs $k$ allows the wheel to yield on the front side, while the said springs, being unyielding at the back, have the tendency to cause the wheel to run forward as soon as the rider's weight is on the bicycle, one of the essential features in this device being the said coiled springs $k$ on the wires $g$ working in conjunction with the flat springs $j$, as shown.

The advantages of the device I consider to be as follows: The bicycle will run easier than the old style of machines with pneumatic tires and on any kind of roads, the improved construction of the wheels giving a soft, easy, elastic motion which every rider of a bicycle is pleased to obtain. The device can also be easily adapted to run on ice by the addition of a belt-tire on each wheel to which projections have been attached; and it may further be said that the resilient action of the springs $j$ between the tire and rim is such that after the bicycle is started by the rider the normal tendency of the wheel is to go forward with very little action of the pedals on account of the peculiar construction and position of the springs. At the same time the rider is provided with a safe, elastic, and comfortable seat.

Having thus described my device and its advantages, what I claim as my invention, and desire to secure by Letters Patent, is—

1. In a wheel, lugs or blocks secured to the inner side of the outer rim, a wire rod connecting each two blocks, a movable plate made to slide on said wire, a compound-curved flat spring pivotally connected to a cross-pin of the sliding plate and to the inner rim, a spiral spring surrounding the wire in rear of the slide-plate to prevent it going back too far, all constructed substantially as and for the purpose specified.

2. A wheel constructed with an outer wooden tire $a$, and an inner metallic rim $b$, with a space between each, a series of projections or blocks $d$, $e$, attached to the outer tire, a wire $g$, held between the said blocks, a slide-plate $h$, made to be carried on said wire $g$, a compound-curved flat spring $j$, pivotally connected to a pin $i$, on the slide-plate $h$, and the opposite end rigidly connected to the inner rim $b$, a spiral spring $k$, made to surround the wires $g$, and impinge on the slide-plates $h$, and the rear block $e$, substantially as specified.

Dated at Hamilton, Ontario, Canada, this 6th day of September, 1899.

M. J. DONOVAN.

In presence of—
W. H. HOLMAN,
WM. BRUCE.